J. BAUDOT.
ROTARY EXPLOSION MOTOR.
APPLICATION FILED NOV. 24, 1913.

1,256,647.

Patented Feb. 19, 1918.
6 SHEETS—SHEET 3.

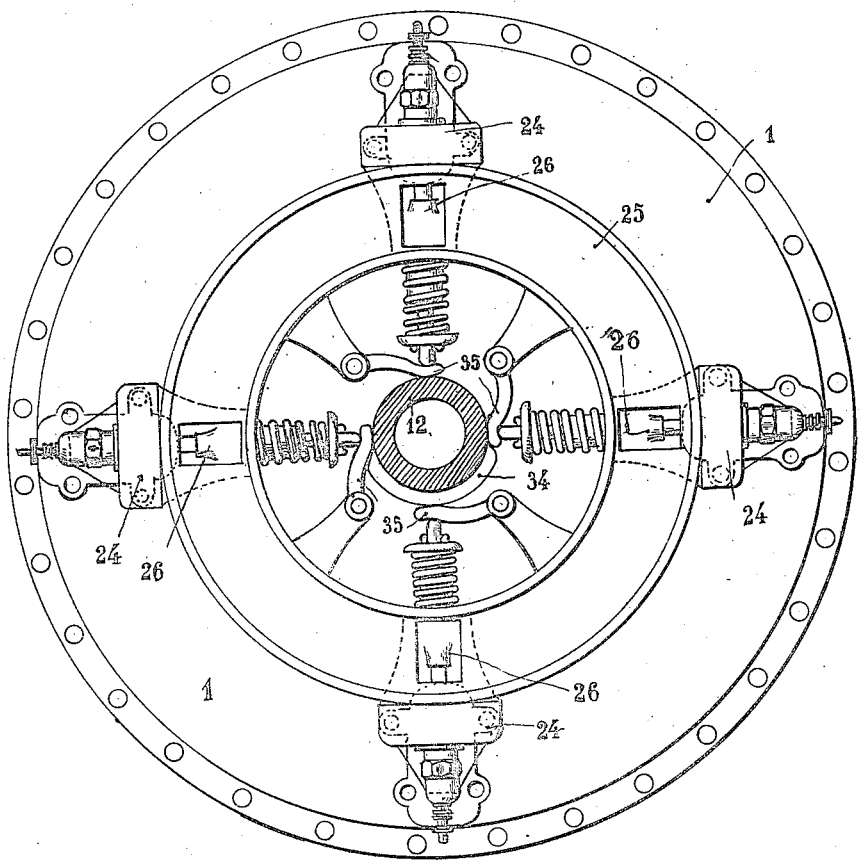

J. BAUDOT.
ROTARY EXPLOSION MOTOR.
APPLICATION FILED NOV. 24, 1913.

1,256,647.

Patented Feb. 19, 1918.
6 SHEETS—SHEET 5.

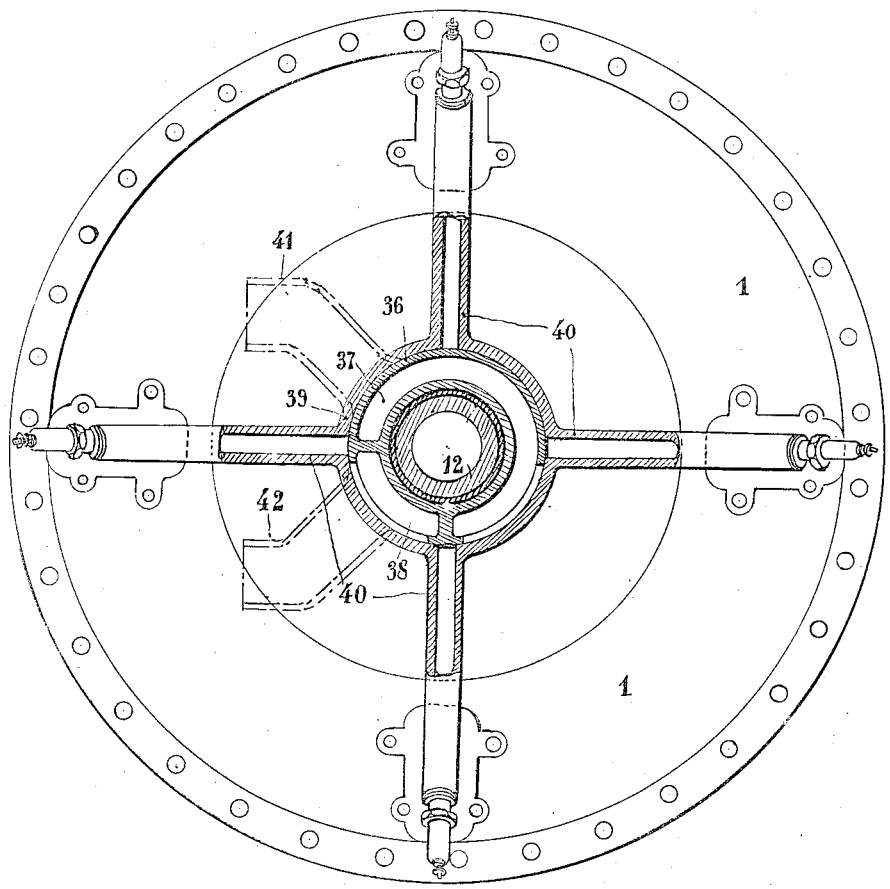

UNITED STATES PATENT OFFICE.

JOSEPH BAUDOT, OF TOURCOING, FRANCE.

ROTARY EXPLOSION-MOTOR.

1,256,647.    Specification of Letters Patent.    Patented Feb. 19, 1918.

Application filed November 24, 1913. Serial No. 802,776.

*To all whom it may concern:*

Be it known that I, JOSEPH BAUDOT, a citizen of the Republic of France, residing at Tourcoing, Nord, France, have invented Improvements in Rotary Explosion-Motors, of which the following is a specification.

This invention has for its object to provide a rotary explosion motor of a type that may be described as a combination of a four stroke cycle explosion motor and a polycylindrical rotary motor, that is to say the arrangement of the motor parts is such that the explosions which occur four times per revolution take place practically without interruption.

The improved motor comprises a rotary member in the form of a hollow annular body divided into four compartments or cylinders which are entirely independent from each other, and within which there are arranged to work pistons that are coupled in pairs and are associated by appropriate relative connecting mechanism with a relatively fixed fulcrum. The connecting mechanism in question allows the pistons to act in their respective cylinders exactly as do the pistons of a four stroke cycle explosion motor, that is to say to draw in the fresh gas, to compress this gas up to the moment when it is exploded, allow the exploded gas to act by expansion on the corresponding abutment or cylinder end, and, finally to expel the products of combustion.

The improved rotary explosion motor operating as set forth may work with or without valves, and the parts of the relative connecting mechanism for connecting the pistons to the fulcrum are immersed in an oil bath contained in a casing which is connected to the rotary body in which the cylinders are formed and takes part in the rotary movement of the said body.

The improved motor enables almost the whole of the effect of the expansion of the gases to be utilized and practically all the force which results therefrom is transmitted to the driving shaft. In effect the rotary body formed by the cylinders constitutes an active movable member, and the pistons, while acting as reactive members, assist in part the rotary effort produced by the force of the explosions acting on the cylinder ends or abutments. Furthermore, as the pistons are guided independently of the cylinders the cylinders are not subjected to any uneven wear by friction of the pistons working therein and consequently any possibility of the bore of the cylinders becoming oval is prevented. The improved motor is very "flexible," possesses great efficiency, is of simple construction and comparatively cheap to construct, at the same time it is light and takes up little space.

Figure 1 of the accompanying drawings illustrates in central vertical longitudinal section one construction of the improved motor provided with inlet and exhaust valves.

Fig. 4 is a vertical transverse section taken through the inlet and exhaust valves for the motor fluid and corresponding to the line E—F of Fig. 1.

Fig. 7 is a vertical transverse section corresponding to the line G—H of Fig. 6.

Figure 1:
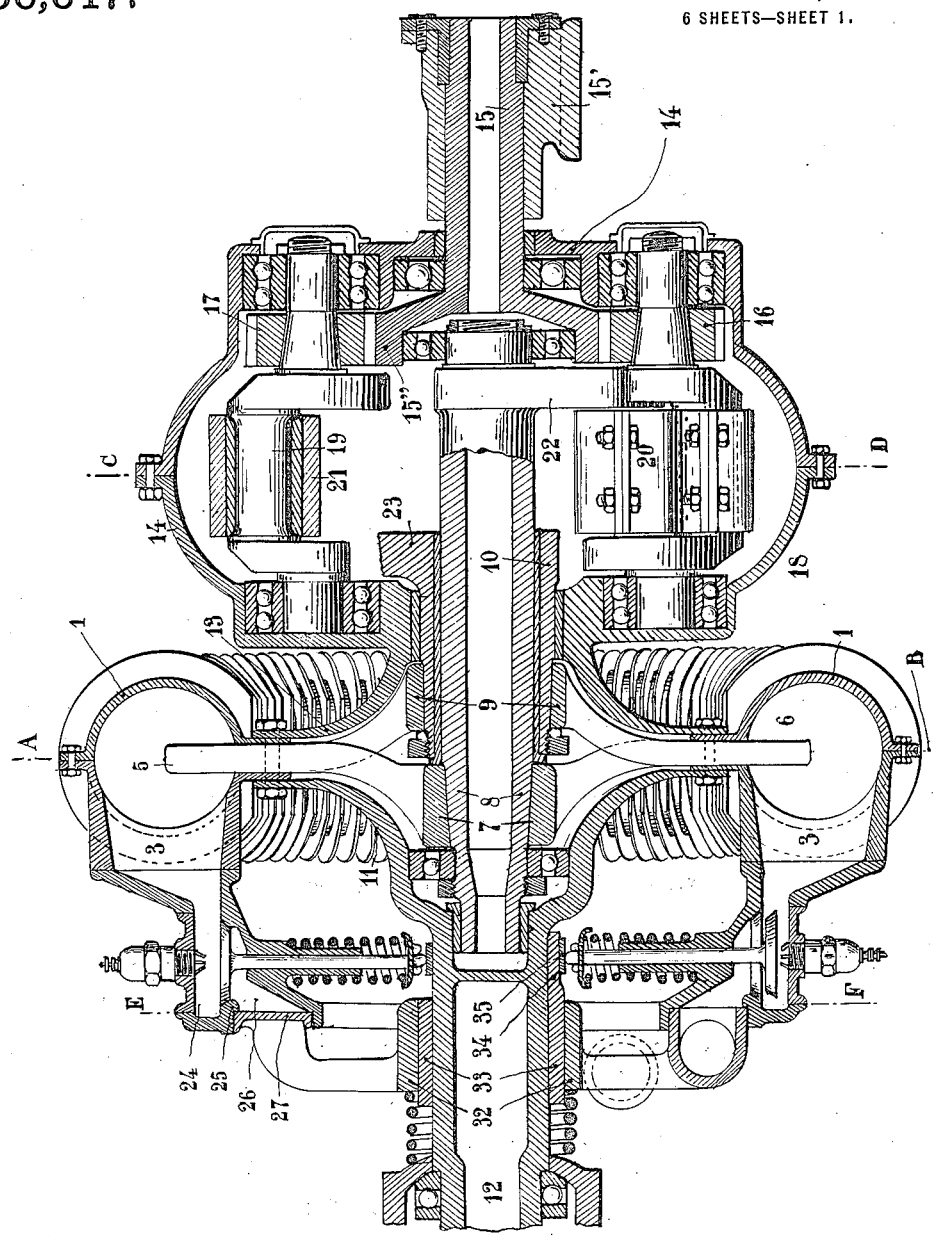
Figure 2:
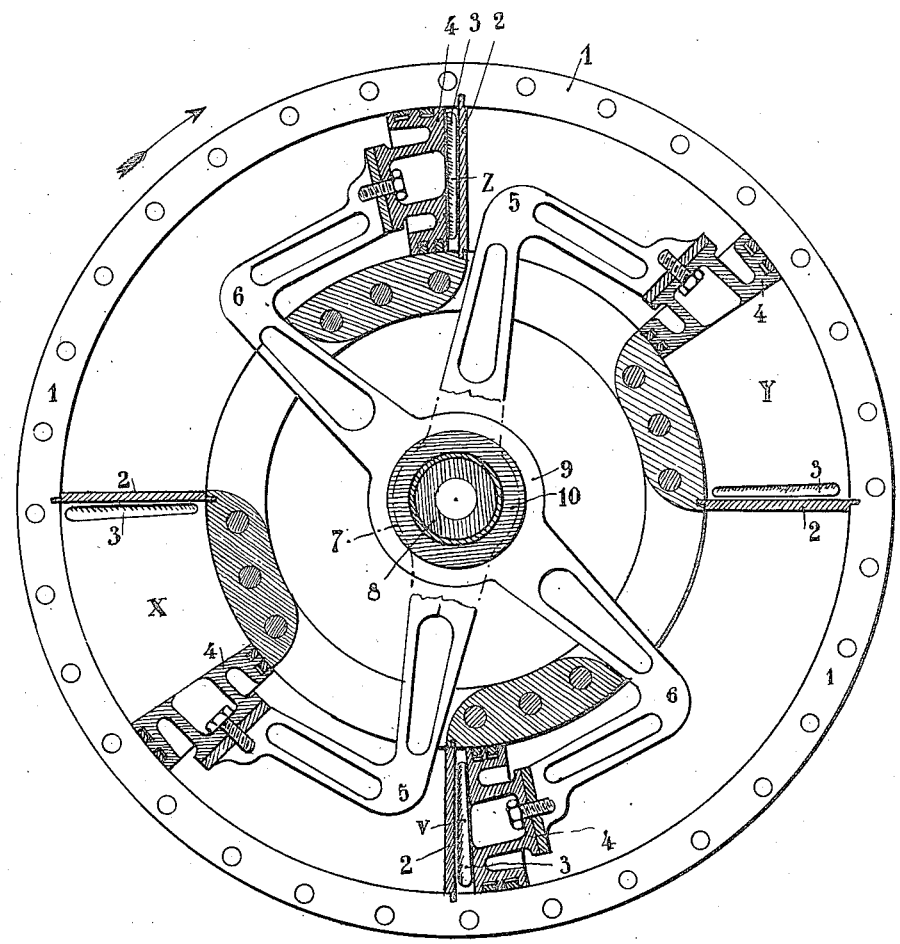
Fig. 2 is a vertical transverse section taken through the cylinders of the motor and corresponding to the line A—B of Fig. 1.

Referring to Figs. 1 to 5, the rotary explosion motor illustrated comprises a movable member consisting of a hollow annular body 1 the interior of which is divided, by fixed partitions or abutments 2 into four equal parts that constitute cylinders each formed with an opening 3 for the inlet and exhaust, see Figs. 1 and 2. Arranged to work in the four cylinders are pistons 4, 4, 4, 4 connected together in pairs by curved arms 5 and 6 which extend through slots formed in the inner wall of the annular member 1. The arm 5 is provided with a boss 7 which is fixed on a hollow shaft 8, and the arm 6 is provided with a boss 9 which is fixed on a hollow shaft 10.

Bolted to one side of the movable member 1 is a disk or plate 11. Projecting from the center of the outer side of the disk or plate 11 is a shaft 12 which serves as the driving shaft. Bolted on the other side of the movable member 1 is a disk or plate 13 which is formed in one with a casing 14 the front portion of which may be removable as shown. The casing 14, which rotates with the movable member 1, is freely mounted at its outer end upon a shaft 15 that is rigidly fixed to a part 15' of the stationary frame of the motor, see Fig. 1, and inside the casing is formed in one with a toothed wheel 15" which is consequently also fixed. The fixed shaft 15 is in line with the driving shaft 12.

Figure 3:
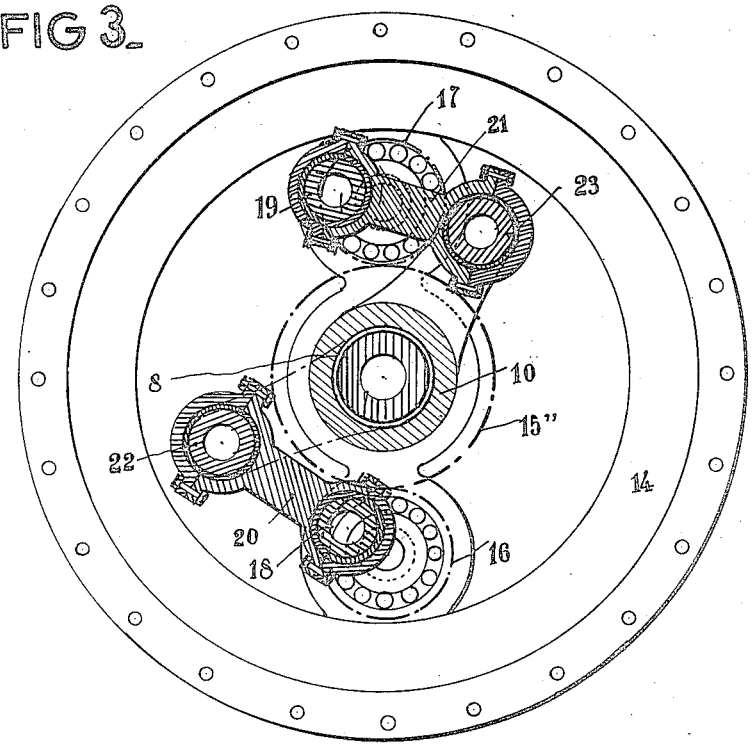
Fig. 3 is a vertical transverse section taken through the casing of the motor and corresponding to the line C—D of Fig. 1.
Figure 5:
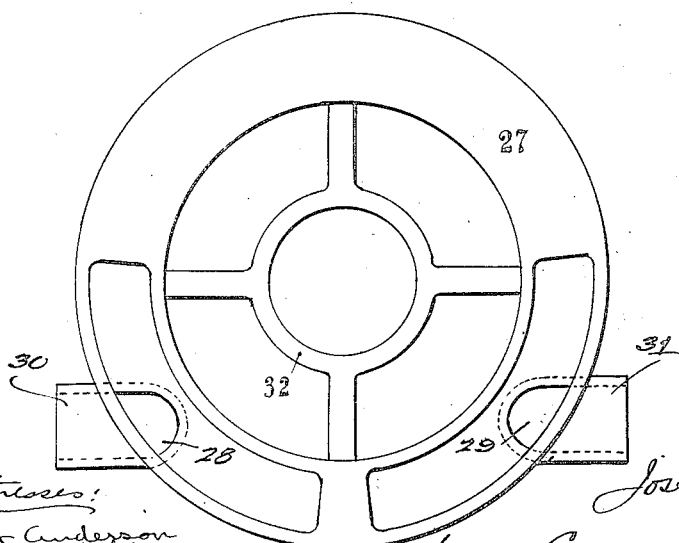
Fig. 5 is a front view of a fixed ring formed with inlet and exhaust ports for the motor fluid, located in front of the valves.

Gearing with the toothed wheel 15" are two pinions 16 and 17 which are respectively fixed to two cranks 18 and 19, see Figs. 1 and 3, the journals of which rotate in ball bearings suitably fixed in the casing 14 so that the cranks 18 and 19 and their pinions 16 and 17 are carried around the fixed toothed wheel 15" as the casing 14 rotates.

The cranks 18 and 19 are connected by links 20 and 21 to the free ends of arms or rods 22 and 23 that project from the shafts 8 and 10 on which the piston arms 5 and 6 are fixed.

The openings 3 for the inlet and exhaust of the motor fluid each communicates with a corresponding valve chest 24, see Figs. 1 and 4, provided with a valve and with a sparking plug. The four valve chests are connected by a distributing ring 25 having four pockets 26 corresponding to the valve chests 24. The ring 25 is mounted to rotate with slight friction against a counter ring 27, see Figs. 1 and 5, formed with ports 28 and 29 in communication with passages 30 and 31 one of which serves for the inlet of the motive fluid and the other for the escape of the burnt gases.

The counter ring 27 is fixed to the frame of the motor, which is not shown, and is provided with a central boss 32 within which the driving shaft 12 freely rotates. The boss 32 is fitted with a sleeve 33, see Figs. 1 and 4, having an inwardly extending part 34 adapted to act as a cam for controlling the valves by means of levers 35 which are pivoted to lugs projecting from the ring 25. The socket 33 may be angularly adjusted within the boss 32 so that the times at which the valves act can be varied and the advance or retardation of the inlet or exhaust be thereby easily regulated.

The working of the motor is as follows:—

Assuming the parts to be in the position shown in Fig. 2, if the mixture previously compressed in the cylinder Z is exploded the expansive force of the gases will tend to force the corresponding partition or abutment 2 and the piston 4 of this cylinder apart. As however the partition or abutment 2 is fixed to the movable member 1 the said member will therefore be carried around in the direction of the arrow and will cause the driving shaft 12 as well as the casing 14 to rotate, while the piston 4, acting as a reactive member will not be able to move in the cylinder except by carrying around the hollow shaft 10 which is connected to the piston by the arm 6. Through the arm 23 and link 21 the shaft 10 will cause the crank 19 and consequently the pinion 17 also to rotate relatively to the rotation thereof caused by engagement of the said pinion with the fixed wheel 15" and owing to the rotation of the casing 14. The result will be that the relative rotation of the pinion will also rotate the casing 14 which carries it and within which it rotates.

During this movement the pinion 16, which is also in gear with the fixed toothed wheel 15" and carried around by the casing 14, will be forced to correspondingly rotate, and, by means of the crank 18, link 20 and arm 22 will so rotate the hollow shaft 8 as to force backwardly the pistons 4, 4 connected thereto by the arms 5, and situated in the cylinders X and Y. The burnt gases will be thereby expelled from the cylinder X and a fresh charge compressed in the cylinder Y. During these movements the piston of the cylinder V which is connected by the arm 6, to the piston of the cylinder Z, will be making its suction stroke.

It will be seen that in the improved motor the main active member is the hollow annular body 1 so that rotation is transmitted to the driving shaft 12 without the necessity of intermediate parts, such as cranks, connecting rods, etc., while the force to which the reactive members formed by the piston 4 are subjected, instead of offering a resistance to these rotary movements on the contrary in a great measure facilitates or assists such movements, because the cranks actuated by the pistons and acting on the planet pinions 16 and 17 of the toothed sun wheel 15" have got over the dead points.

It will also be seen that the casing 14 connected to the rotary hollow annular member 1 and rotating with it prevents the oil which is necessary for the lubrication of the parts which it incloses from being forced into the said hollow annular member by centrifugal force, and that the valves which serve both for the inlet and exhaust are efficiently cooled by the admission of the fresh gas. The arrangement of the motor is also advantageous in that the valves with which it is fitted are simply actuated by the passage of the valve stems over the fixed cam 34, the angular position of which is capable of adjustment at will so as to advance or retard the inlet or the exhaust.

Figure 6:
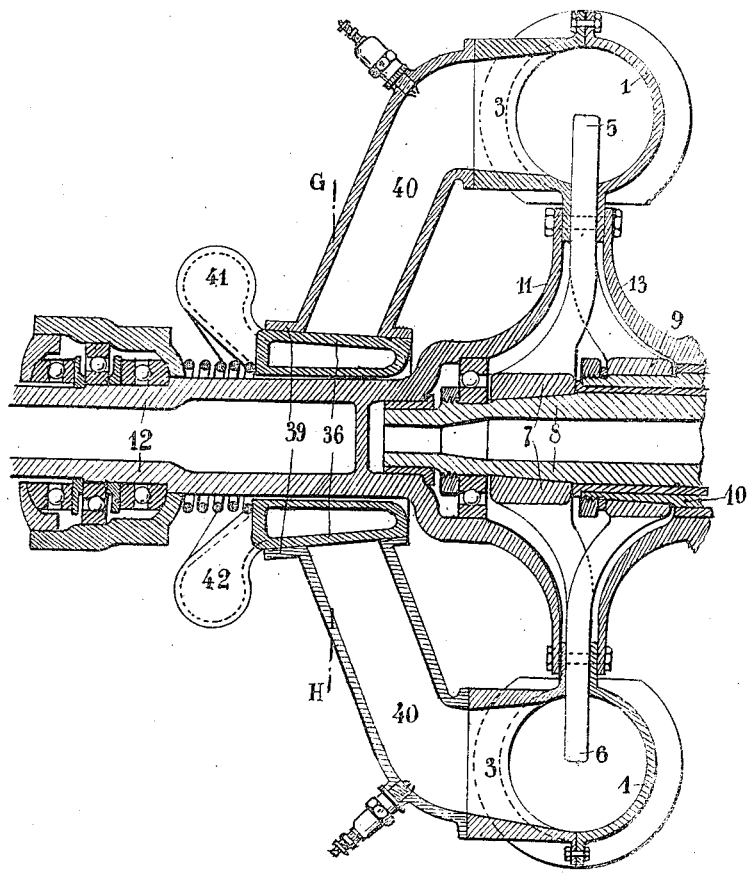
Fig. 6 is a detail view in longitudinal section showing the arrangement of the inlet and exhaust chamber of the improved motor when constructed to work without valves.

Although the motor just described has valves it must be understood that it is possible to construct the improved motor without valves. An example of such a construction is illustrated in the modification shown in Figs. 6 and 7.

In this modified construction the inlet and exhaust controlling mechanism comprises an annular chamber 36, of slightly conical form, mounted on the driving shaft 12 and divided by partitions into two independent compartments 37 and 38 that are formed with suitable ports at the periphery of the chamber. Mounted to rotate with slight friction on the chamber 36 is a sleeve 39 having radially extending pipes or hollow branches 40, 40, 40, 40 which respectively communicate with the inlet and exhaust openings 3, 3, 3, 3 of the motor cylinders. The sparking plugs may be arranged in the said pipes or branches 40.

As will be seen the sleeve 39 is fixed to the movable member 1 and rotates with it on the chamber 36; it therefore constitutes a distributing device, and places the compartments 37 and 38 successively in communication with the motor cylinders. Pipes 41 and 42 for the explosive mixture and the exhaust respectively, are connected to the compartments 37 and 38. The annular chamber 36 is capable of slight adjustment on the driving shaft 12 so that the inlet or exhaust can be retarded or advanced as desired.

What I claim is:—

1. In a rotary explosion motor, a hollow annular member mounted to rotate, pistons arranged to work within the annular chamber of said rotary member, partitions dividing the annular chamber of said member into compartments corresponding in number to the number of said pistons, a driving shaft operatively connected to said member, means for delivering explosive mixture to and removing products of combustion from each compartment of said rotary member between the corresponding said piston and the corresponding said partition ahead of said piston in the direction of rotation of said member, and means operatively connected to said driving shaft and driven by the effect of the explosions on said pistons.

2. In a rotary explosion motor, a hollow annular member mounted to rotate, pistons arranged to work within the annular chamber of said rotary member, partitions dividing the annular chamber of said member into compartments corresponding in number to the number of said pistons, a driving shaft operatively connected to said member, means for delivering explosive mixture to and removing products of combustion from each compartment of said rotary member between the corresponding said piston and the corresponding said partition ahead of said piston in the direction of rotation of said member, planet pinions carried by said rotary member, a fixed sun wheel about which said planet pinions revolve and with which they gear, cranks on which said pinions are fixed, and connecting means between said pistons and said cranks.

3. In a rotary explosion motor, a hollow annular member mounted to rotate, pistons arranged to work within the annular chamber of said rotary member, partitions dividing the annular chamber of said member into compartments corresponding in number to the number of said pistons, a driving shaft operatively connected to said member, means for delivering explosive mixture to and removing products of combustion from each compartment of said rotary member between the corresponding said piston and the corresponding said partition ahead of said piston in the direction of rotation of said member, planet pinions carried by said rotary member, a fixed sun wheel about which said planet pinions revolve and with which they gear, cranks on which said pinions are fixed, levers to which said pistons are connected in pairs, shafts on which said levers are fixed, arms on said shafts, and links connecting said arms to said cranks.

4. In a rotary explosion motor, a hollow annular member mounted to rotate, pistons arranged to work within the annular chamber of said rotary member, partitions dividing the annular chamber of said member into compartments corresponding in number to the number of said pistons, a driving shaft operatively connected to said member, means for delivering explosive mixture to and removing products of combustion from each compartment of said rotary member between the corresponding said piston and the corresponding said partition ahead of said piston in the direction of rotation of said member, and means for moving said pistons to and fro in the compartments of said rotary member.

5. In a rotary explosion motor, a hollow annular member mounted to rotate, pistons arranged to work within the annular chamber of said rotary member, partitions dividing the annular chamber of said member into compartments corresponding in number to the number of said pistons, a driving shaft operatively connected to said member, means for delivering explosive mixture to and removing products of combustion from each compartment of said rotary member between the corresponding said piston and the corresponding said partition ahead of said piston in the direction of rotation of said member, and means driven by said rotary member for moving said pistons to and fro in the compartments of said rotary member.

6. In a rotary explosion motor a hollow annular member mounted to rotate, pistons arranged to work within the annular chamber of said rotary member, partitions dividing the annular chamber of said member into compartments corresponding in number to the number of said pistons, a driving shaft operatively connected to said member, means for delivering explosive mixture to and removing products of combustion from each compartment of said rotary member between the corresponding said piston and the corresponding said partition ahead of said piston in the direction of rotation of said member, mechanism for moving said pistons to and fro in the compartments of said rotary member, and an oil chamber connected to said rotary member and in which said mechanism is located.

7. In a rotary explosion motor, a hollow annular member mounted to rotate, pistons arranged to work within the annular chamber of said rotary member, partitions dividing the annular chamber of said member into compartments corresponding in number to the number of said pistons, a driving shaft operatively connected to said member, means comprising a common inlet and exhaust port for delivering explosive mixture to and removing products of combustion from each compartment of said rotary member between the corresponding said piston and the corresponding said partition ahead of said piston in the direction of rotation of said member, and means operatively connected to said driving shaft and driven by the effect of the explosions on said pistons.

8. In a rotary explosion motor, a hollow annular member mounted to rotate, pistons arranged to work within the annular chamber of said rotary member, partitions dividing the annular chamber of said member into compartments corresponding in number to the number of said pistons, a driving shaft operatively connected to said member, means comprising a common inlet and exhaust port for delivering explosive mixture to and removing products of combustion from each compartment of said rotary member between the corresponding said piston and the corresponding said partition ahead of said piston in the direction of rotation of said member, planet pinions carried by said rotary member, a fixed sun wheel about which said planet pinions revolve and with which they gear, cranks on which said pinions are fixed, and connecting means between said pistons and cranks.

9. In a rotary explosion motor, a hollow annular member mounted to rotate, pistons arranged to work within the annular chamber of said rotary member, partitions dividing the annular chamber of said member into compartments corresponding in number to the number of said pistons, a driving shaft operatively connected to said member, means comprising a common inlet and exhaust port for delivering explosive mixture to and removing products of combustion from each compartment of said rotary member between the corresponding said piston and the corresponding said partition ahead of said piston in the direction of rotation of said member, and means for moving said pistons to and fro in the compartments of said rotary member.

10. In an explosion motor, a driving shaft, a hollow annular body fixed to said shaft and formed with four common inlet and exhaust ports, four partitions fixed in the hollow annular body dividing its interior into four equal parts corresponding one to each port, four pistons working in the compartments of said annular body, two levers connecting said pistons together in pairs, coaxial shafts on which said levers are fixed, a casing fixed to said annular body, two cranks mounted to rotate in said casing, planet pinions on said cranks, a fixed sun wheel located within said casing and engaged by said pinions, arms on said coaxial shafts, and links connecting said arms to said cranks.

11. In an explosion motor, a driving shaft, a hollow annular body fixed to said shaft and formed with four common inlet and exhaust ports, four partitions fixed in the hollow annular body dividing its interior into four equal parts corresponding one to each port, four pistons working in the compartments of said annular body, two levers connecting said pistons together in pairs, coaxial shafts on which said levers are fixed, an oil containing casing fixed to said annular body, two cranks mounted to rotate in said casing, planet pinions on said cranks, a fixed sun wheel located within said casing and engaged by said pinions, arms on said coaxial shafts, and links connecting said arms to said cranks.

12. In an explosion motor, a driving shaft, a hollow annular body fixed to said shaft and formed with four common inlet and exhaust ports, a fixed ring formed with inlet and exhaust ports adapted to communicate with the common inlet and exhaust ports of said annular body and about which said annular body is mounted to rotate, four partitions fixed in the hollow annular body dividing its interior into four equal parts, corresponding one to each port, four pistons working in the compartments of said annular body, two levers connecting said pistons together in pairs, coaxial shafts on which said levers are fixed, a casing fixed to said annular body, two cranks mounted to rotate in said casing, planet pinions on said cranks, a fixed sun wheel located within said casing and engaged by said pinions, arms on said coaxial shafts, and links connecting said arms to said cranks.

13. In an explosion motor, a driving shaft, a hollow annular body fixed to said shaft and formed with four common inlet and exhaust ports, a fixed ring formed with inlet and exhaust ports adapted to communicate with the common inlet and exhaust ports of said annular body and about which said annular body is mounted to rotate, four partitions fixed in the hollow annular body dividing its interior into four equal parts corresponding one to each port, four pistons working in the compartments of said annular body, two levers connecting said pistons together in pairs, coaxial shafts located in line with said driving shaft and on which said levers are fixed, a casing fixed to said annular body, two cranks mounted to rotate in said casing, planet pinions on said cranks, a fixed sun wheel located within said casing and engaged by said pinions, arms on said coaxial shafts, and links connecting said arms to said cranks.

Signed at Roubaix, France, this eleventh day of November, 1913.

JOSEPH BAUDOT.

Witnesses:
P. V. PICKY,
ALFRED C. HARRISON.